US007124934B2

(12) United States Patent
Graham

(10) Patent No.: US 7,124,934 B2
(45) Date of Patent: Oct. 24, 2006

(54) DOCUMENT AUTHENTICATION METHOD AND APPARATUS

(75) Inventor: Martin Alan Scott Graham, Queensland (AU)

(73) Assignee: Accudent Pty Ltd., Queensland (AU)

( * ) Notice: Subject to any disclaimer, the term of this patent is extended or adjusted under 35 U.S.C. 154(b) by 0 days.

(21) Appl. No.: 10/859,989

(22) Filed: Jun. 4, 2004

(65) Prior Publication Data

US 2004/0232218 A1 Nov. 25, 2004

Related U.S. Application Data

(62) Division of application No. 10/070,610, filed as application No. PCT/AU00/01081 on Sep. 8, 2000, now Pat. No. 6,764,000.

(30) Foreign Application Priority Data

Sep. 8, 1999 (AU) .................................... PQ2737

(51) Int. Cl.
*G06F 17/60* (2006.01)

(52) U.S. Cl. ...................................... 235/379; 380/382

(58) Field of Classification Search ................ 235/379, 235/380, 382; 194/206, 207, 534; 382/135
See application file for complete search history.

(56) References Cited

U.S. PATENT DOCUMENTS 4,418,411 A * 11/1983 Strietzel ..................... 714/819
5,790,245 A * 8/1998 Kanesashi .................... 356/71
5,818,021 A * 10/1998 Szewczykowski .......... 235/380
5,895,073 A * 4/1999 Moore ......................... 283/70
6,065,672 A * 5/2000 Haycock ..................... 235/379
6,131,718 A * 10/2000 Witschorik .................. 194/206

FOREIGN PATENT DOCUMENTS

WO WO 99/05624 2/1999

* cited by examiner

*Primary Examiner*—Ahshik Kim
*Assistant Examiner*—Daniel A. Hess
(74) *Attorney, Agent, or Firm*—Stites & Harbison PLLC; Douglas E. Jackson

(57) ABSTRACT

Documents (eg., bank notes, travellers cheques, credit cards) (10) are authenticated by scanning the documents for one or more identifying features and/or indicia (11–19), comparing the sanned features/indicia (11–19) with stored information in a database and transmitting a signal indicating the authenticity, or otherwise, of the documents (10). In another aspect, documents that are being deposited into a receptacle are scanned for identifying features and/or indicia and the features and/or indicia are recorded in a card. Access to the documents in the receptacle is possible only by the presentation of the card to a reader associated with the receptacle.

9 Claims, 7 Drawing Sheets

DOCUMENT AUTHENTICATION METHOD AND APPARATUS

CROSS REFERENCE TO RELATED APPLICATIONS

This application is a divisional of application Ser. No. 10/070,610, filed Mar. 8, 2002 now U.S. Pat. No. 6,764,000, which is the National Stage of International Application No. PCT/AU00/01081, filed Sep. 8, 2000.

BACKGROUND OF THE INVENTION

1. Field of the Invention

THIS INVENTION relates to a document authentication method and apparatus.

The invention is particularly suitable for, but not limited to, validation of financial instruments, including cash (ie., bank notes), personal cheques, traveller's cheques, credit cards, debit cards and the like.

The invention is also particularly suitable for, but not limited to, the validation of legal instruments such as letters, agreements, licences, bills, and copies (eg., photocopies) thereof.

2. Prior Art

The counterfeiting of documents, particularly currency, has been a major problem for the authorities for many years. Money issuing authorities (eg., Reserve Banks or Mints) have adopted many different methods in an attempt to overcome or minimise counterfeiting of currency and other financial documents, and examples have included features or indicia such as watermarks and holograms. Examples of papers discussing such matters include (1) "Spacial Logic Algorithms Using Basic Morphological, Anologic CNN Operations" (Zarande et al) in "The Proceedings of the 1994 Third IEEE International Workshop on Cellular Neural Networks and their Applications", Rome, Italy, published in the "International Journal of Circuit Theory and Applications" v 24 n 3 May–June 1996, pages 283–300; (2) "Development of Embossed Holograms" (Haines) in "Proceedings of SPIE—The International Society for Optical Engineering", v 2652, 1996, Society of Photo-Optical Instrumentation Engineers, Bellingham, Wash., United States of America, pages 45–52; (3) "Performance of Diffraction Grating on a Banknote—The Experience with the Australian Commemorative Note" (Hardwick) in "Proceedings of SPIE—The International Society for Optical Engineering", v 1210, published by The International Society for Optical Engineering, Bellingham, Wash., United States of America, pages 20–26; (4) "Optically Variable Devices for use on Bank Notes" (Rolfe) in "Proceedings of SPIE—The International Society for Optical Engineering" v 1210, published by the International Society for Optical Engineering, Bellingham, Wash., United States of America, pages 14–19; (5) "Evaluation of Security Features for new U.S. Currency" (Church et al) in "Proceedings of SPIE—The International Society for Optical Engineering", v 2659, 1996, Society of Photo Optical Instrumentation Engineers, Bellingham, Wash., United States of America, pages 28–36.

Whilst such authentication features or indicia can be placed in bank notes, currency or other financial or legal documents, there is a need for financial or legal instruments bearing such indicia, to be rapidly and accurately-identified and authenticated.

SUMMARY OF THE PRESENT INVENTION

It is an object of the present invention to provide a method where a document (eg., a financial or legal instrument, as hereinbefore described), can be authenticated as either valid, or identified as invalid or counterfeit.

It is a preferred object that the method can be carried out rapidly and accurately.

It is a further preferred object to provide a method which requires minimal hardware requirements.

It is a still further preferred object to provide apparatus for carrying out the method.

Other preferred objects will become apparent from the following description.

In one aspect, the present invention resides in a method for authenticating a document (including, eg., a financial or legal instrument as hereinbefore described) including the steps of:

a) scanning the document for one or more identifying features and/or indicia;

b) comparing the scanned features/indicia against stored information in a database identifying the features/indicia as authentic or otherwise; and c) transmitting a signal confirming whether or not the document is authentic or otherwise.

Preferably, the features/indicia scanned include watermarks, holograms, serial numbers, words, devices, colours (eg., patterns, combinations) or other features or indicia printed on, embossed into, incorporated in, or otherwise forming part of, the document.

Preferably, the database contains one or more features/indicia for comparison by which the authentication of the document may be determined. The document may be authenticated when the features/indicia scanned match the criteria of one or more (but preferably a plurality) of identification components stored in the database.

Preferably, when a document is established to be authentic or otherwise, the signal is transmitted to the location at which the document is scanned to indicate whether or not the document is authentic or otherwise and/or one or more alternative locations, eg., to a security unit.

In a second aspect, the present invention resides in apparatus for authenticating a document (eg., a financial or legal document as hereinbefore described) including:

a terminal operable to scan one or more identifying features or indicia of the document;

a database containing one or more stored identifying features indicative of whether or not the document is authentic or otherwise;

comparator means to compare the scanned features/indicia with the stored identifying features;

transmission means interconnecting the scanning means and the comparator means; and indicator means operable to receive a signal from the comparator means to indicate whether or not the document is authentic or otherwise.

Preferably, the indicator means is provided on the terminal. One or more indicator means may be provided at alternative locations, eg., a bank security unit.

Preferably, the terminal includes scanning means operable to scan the scanned features/indicia hereinbefore described and means to transport the document past the scanning means.

The scanning means may incorporate one or more scanning heads, each operable to scan one or more features/indicia on the documents.

The database may be provided on the central computer which incorporates the comparator means.

The transmission means may incorporate any suitable communication means, eg., telephony, wireless, infra-red, hardware or the like.

In a third aspect, the present invention resides in an apparatus, as described above, where the scanning means is a scanning head passed over the documents (eg., by hand).

In a fourth aspect, the present invention resides in an apparatus for authenticating a document (eg., a financial or legal instrument) including;

a receptacle to receive the document;

means to scan the document as the document enters the receptacle;

data transfer means to transfer scanned data from the scanning means;

and card means operable to receive the data; so arranged that:

the document can only be released from the receptacle when the card means is placed in, or read by, a card reader associated with the receptacle.

BRIEF DESCRIPTION OF THE DRAWINGS

To enable the invention to be fully understood, preferred embodiments will now be described with reference to the accompanying drawings, in which.

DETAILED DESCRIPTION OF THE PREFERRED EMBODIMENTS

Figure 1:
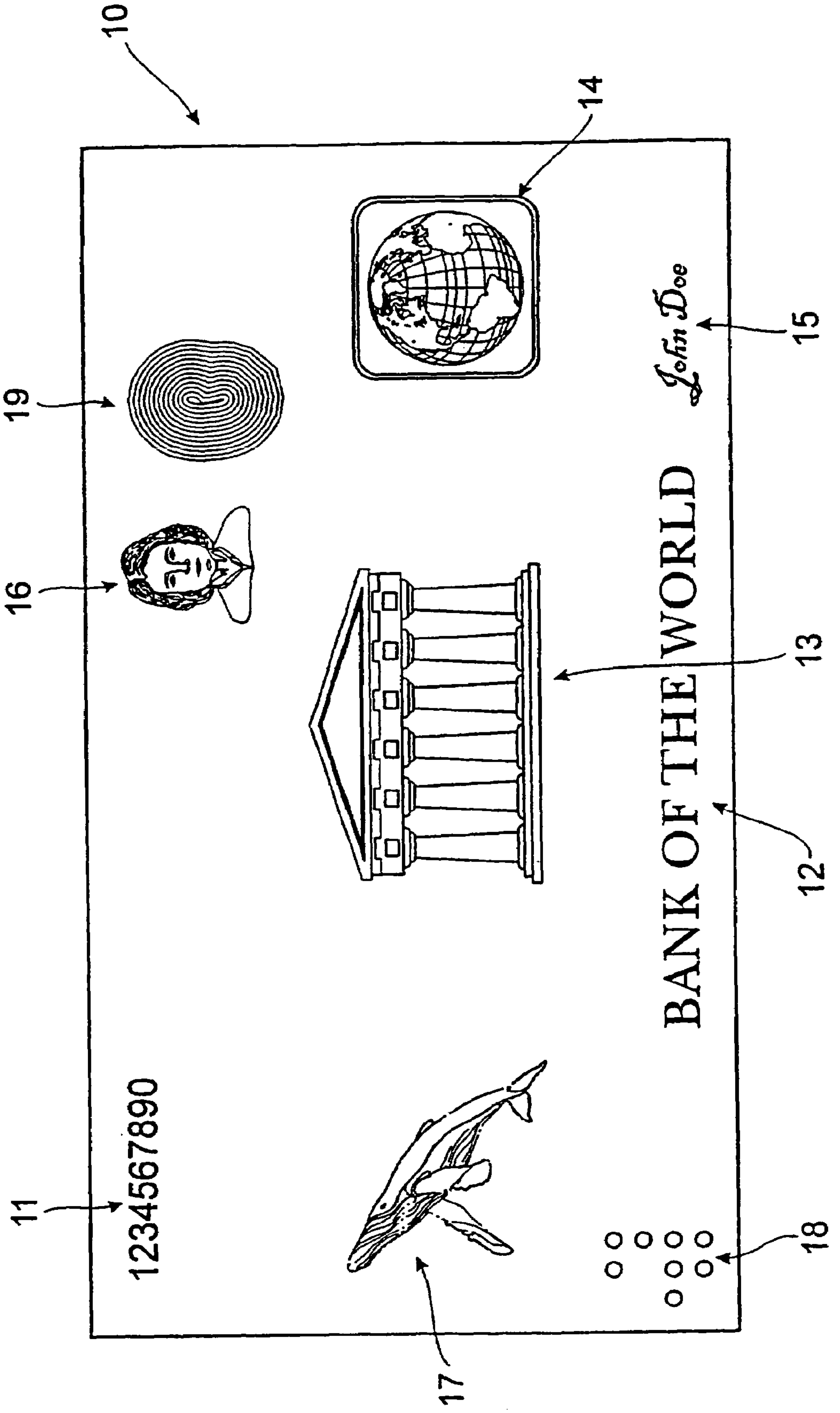
FIG. 1 is a plan view of a document (eg., bank note) to be authenticated.

FIG. 1 is a plan view of a bank note 10 which is an example of a document to be authenticated by the present invention.

The bank note 10 has the following indicia, any one or more of which can be compared against stored indicia:

a) serial number 11;

b) words 12;

c) design (optionally coloured) 13;

d) hologram 14;

e) signature 15;

f) photographic image 16;

g) watermark (or embossing) 17;

h) micro dots 18; and i) thumb- (or finger-) print 19.

Figure 2:
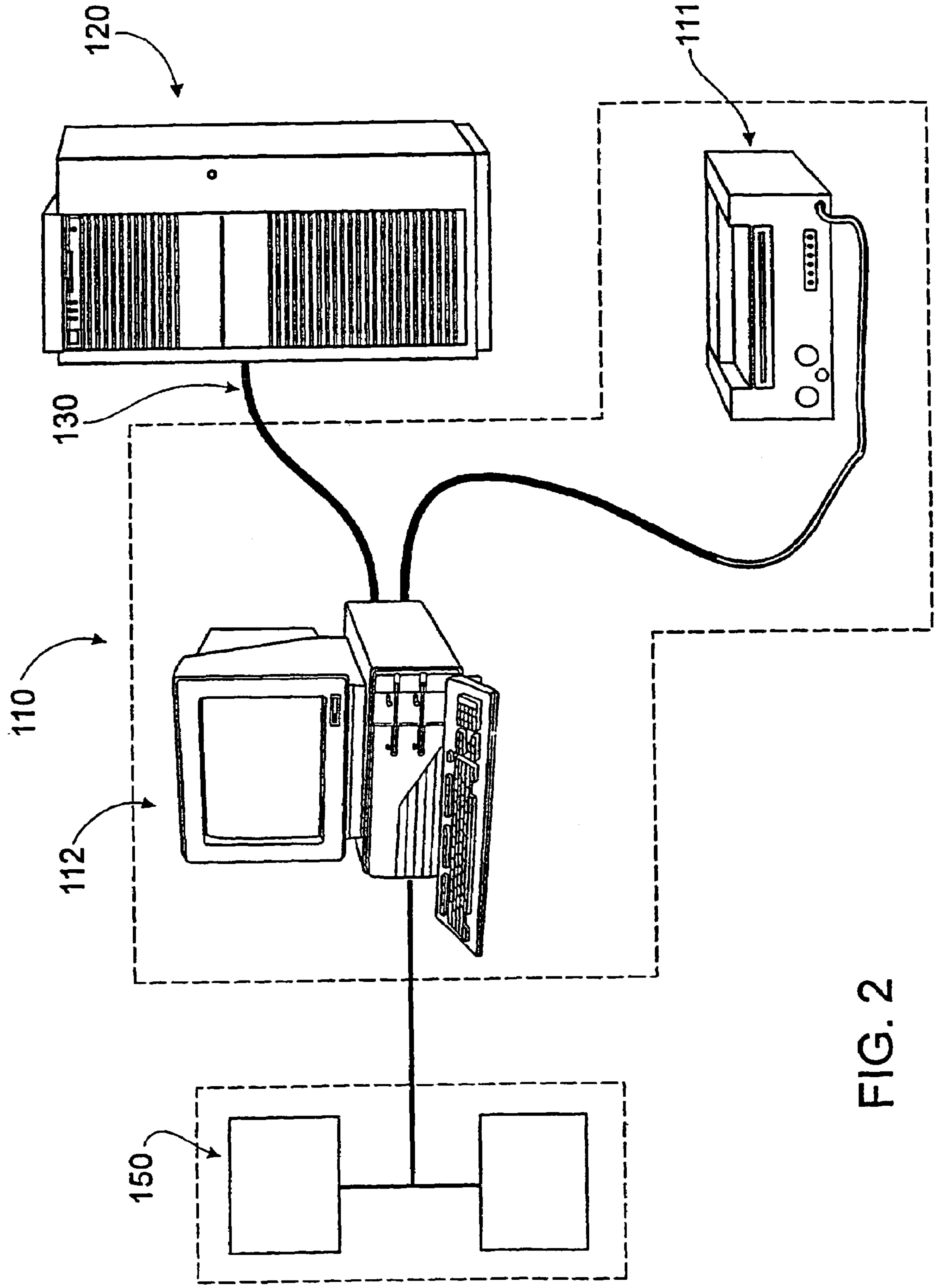
FIG. 2 is a schematic circuit diagram of a first embodiment of the authentication apparatus.
Figure 3:
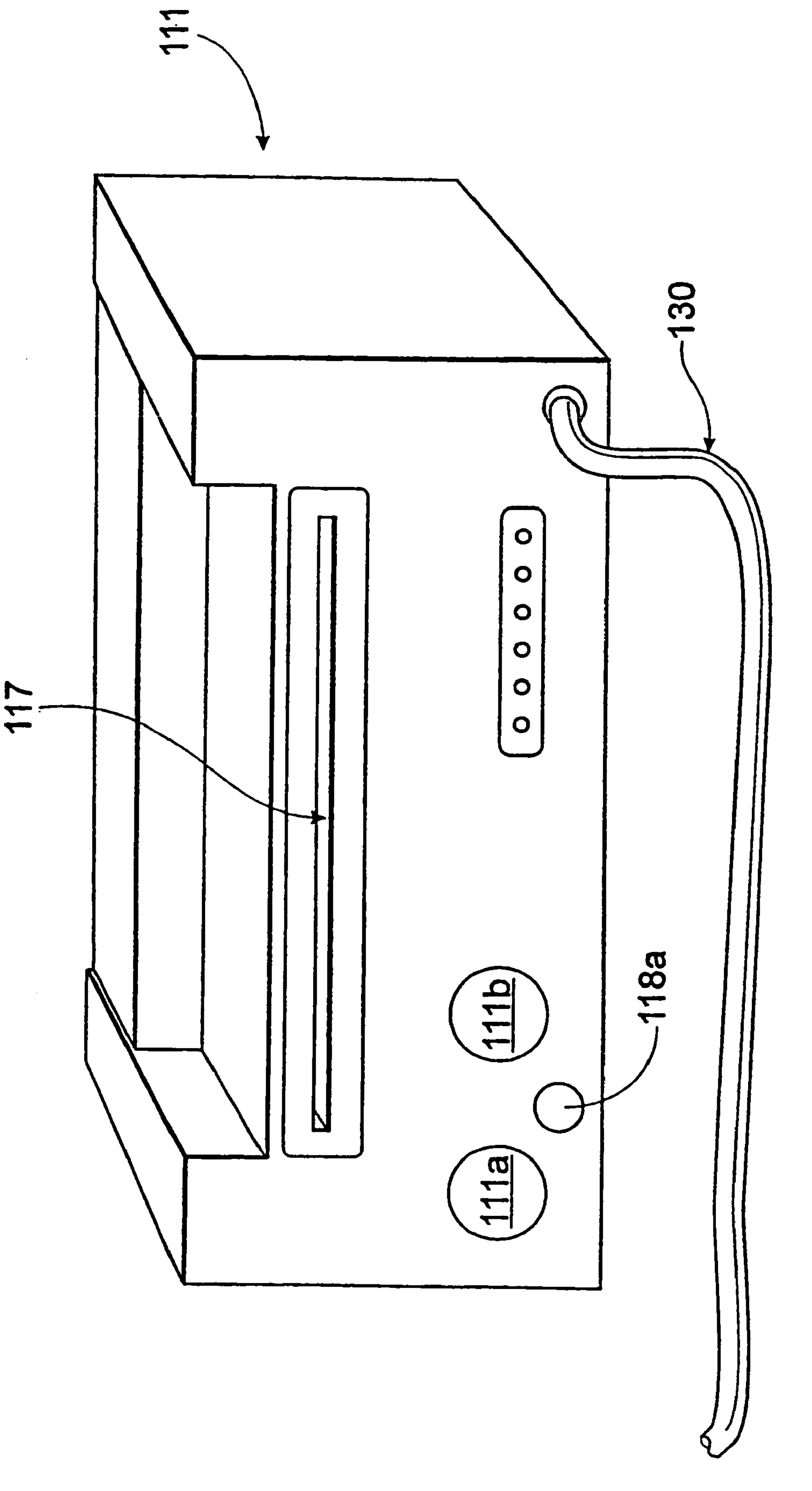
FIG. 3 is a front view of a terminal for the first embodiment.

In a first embodiment (see FIGS. 2 and 3), the system 100 consists of an end user terminal 110 (with a document scanner 111 and end user connector 112) connected to a main computer or central server unit 120 centre that has a resident database 121. The database structure 121 is to be hereinafter described. The computer 120 has an input device 122, central processing unit (CPU) 123 and comparing unit 124, the latter comprising the scanned information (eg., serial number/signature) with the material stored in the database 121.

The end user terminal 110 can be configured in several different ways. It can be a desktop stand-alone device, that is connected to the system in real time. A portable model is also possible in one application that will enable the operator to be away from the network connection. Another configuration of the end user terminal 110 could be the integration of the terminal into a major piece of business equipment.

Figure 4:
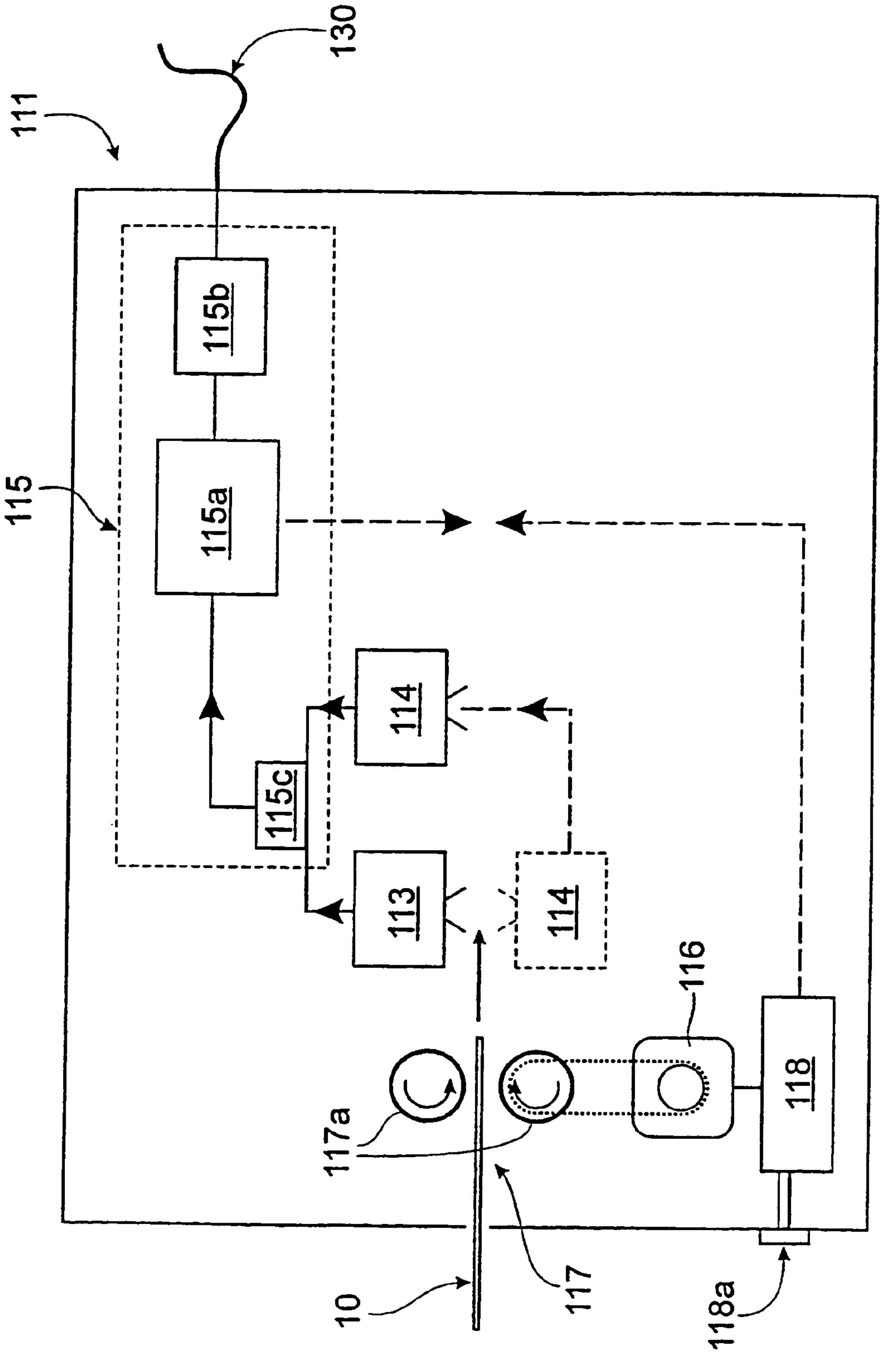
FIG. 4 is a schematic circuit diagram of the scanner of the terminal of FIG. 3.

The end user terminal document scanner 111 consists of a motorised note tray 117 that is used to draw the note (or document) into and through (or into and out of) the terminal. The note 10 is passed past a pair of scanning heads 113, 114. The scanning heads 113, 114 are doubled to ensure the note 10 can be read no matter which way the note 10 is inserted. (As shown in dashed lines in FIG. 4, the scanning heads 113, 114 may be spaced so that the note 10 passes between them.) The scanning heads contain a number of integrated components, which allow the note 10 to be scanned in several ways. Incorporated in the terminal scanner 111 is an information processing unit 115. The information is passed through a line terminal device 130, that is appropriate to the type of institution where the equipment is installed, to the computer 120.

The motorised tray 117 for the terminal unit 111 allows the note 10 to be pulled past the scanning heads 113, 114 at, preferably, a constant velocity. The motor drive 116 for the rollers 117*a* of the tray 112 can be preferably set to an almost infinite number of speeds. A motor control unit 118 is integrated into the information processing unit 115 and relies upon an analog (or digital) control mechanism. (It may be manually set by a control 118*a*.) The type of currency used, the level of identification required and the need for extra analysis can determine the motor control output.

The two identical scanning heads 113, 114 are provided one on each side of the tray 117. In an alternative embodiment, the, or each scanning head may consist of a scanning head with a calibrateable daylight light source and an integrated circuit 115*c* embedded into the head to control the colour analysis process. The scanner 111 may be commercially available and the specification will depend upon the ultimate requirement of the colour analysis unit. The output of the scanning heads 113, 114 is fed to the information processing unit 115 where the information is filtered and processed.

The information processing unit (IPU) 115 consists of the main processing unit 115*a* for the information coming from the scanning unit, and an upgradeable memory module with a "flash memory" (or a ROM) 115*b*. All of the software for the terminal unit 110 and the network interface unit 115 is embedded in the "flash memory" or ROM 115*b*. The embedding of the software in the "flash memory" or ROM 115*b* assists in the maintenance of security of the information and to prevent tampering. Within the IPU 115, a security controller is used to monitor the integrity of the unit by monitoring a is system of electronic locks and seals throughout the system. Should the integrity of the system be breached, the unit 115 will transmit a security alarm to the network control site via computer 120.

Figure 5:
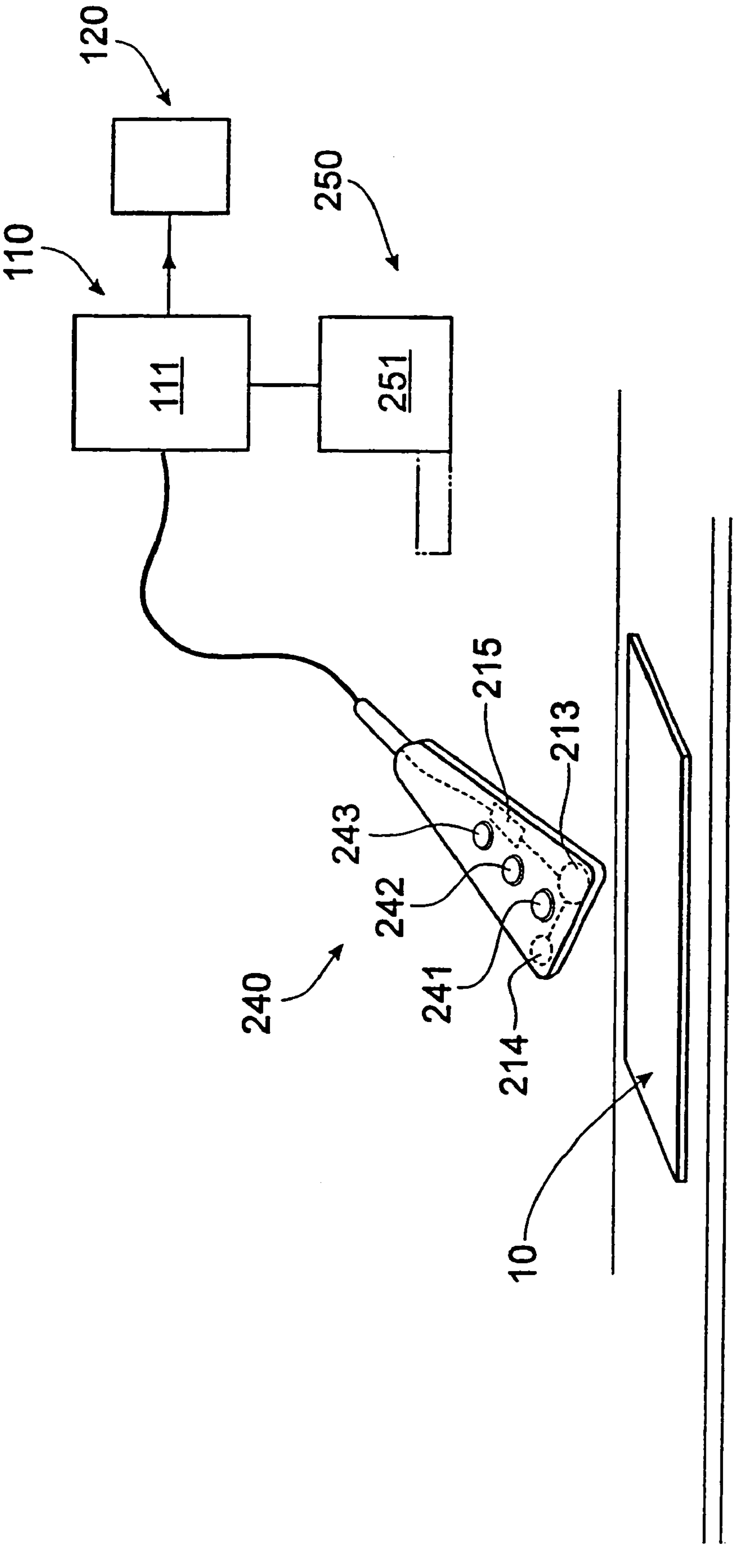
FIG. 5 is a schematic diagram of a hand-held scanner operable with the terminal of FIG. 3.

For applications that take the user away from the normal fixed terminal 110, a portable unit 240 (see FIG. 5) will allow the scanning of discrete amounts of information from a note 10 or other instrument. The portable unit 240 scans the area by the user moving the device over the target area (ie., the note 10) in a constant motion. The information is stored in the unit 240 and compared initially against any information held within an onboard memory. The device 240 can have information downloaded from the system 110 and will normally be used as a first level device used to identify notes or other instruments that require further detailed investigation.

The unit 240 consists of a small scanning head 213 with an integrated light source 214. The information from the scanning head 213 is fed into a cut-down version of the IPU 215. The portable device 240 contains a cut-down version of the colour analysis circuitry and is used to do preliminary analysis of a designated area on the note. The IPU 215 includes solid state memory that allows the storage of the information gathered from the scan. This information is processed and compared with the information held in memory within the device. Output to the operator is in the form of three lights 241–243—"green" 241 for "passed", "yellow" 242 for "unknown" and "red" 243 for a note 10 that is found to match a number in the memory and requires confiscation or other action as appropriate. (With a yellow light 242, the note 10 may require manual checking for authenticity/damage.)

The terminal unit 210 can be integrated into almost all money handling machines and processors 250. These include all types and models of cash drawers 251 or totalisers, all money drop boxes, and the units can also be integrated into most secure money safes. The advantage of the system for money storage is that all of the notes and instruments in the cash storage device 251 can be itemised and accounted for.

The terminal equipment 111 can be locationally separate due to the modular design of the terminal unit 111. This configuration is ideal where the system is located in an area that needs to remove large holdings of cash from close proximity of the public interface.

The terminal unit 111 can be upgraded in steps to include an integrated EFTPOS terminal, allow for the printing of microdot security devices, validation of magnetic swipe cards and smart cards, the automatic compilation of foreign currency and the instant conversion of foreign currency in real time when connected to the international network. Supporting the system can be an add-on system that will allow individuals and companies to print their own cheques from their account and incorporate a number of hidden security features that will be able to be detected through the terminal. These security features may be a mixture of colour and position controlled by a secret embedded algorithm.

The system employs a large distributed database 121 in the central computer 120. The database 121 (for, eg., bank notes) (as a "data vault") may contain bank note numbers/types and files that correspond to its colour analysis profile. This profile is reduced to a number through the use of an algorithm that is a part of the colour analysis system.

When a note 10 or other instrument is fed into the terminal unit 111, the embedded software first determines the denomination of the note 10 through the first output of the colour analysis unit 115*c*. The note 10 is then fully scanned via the outputs of the scanning heads 113, 114, and the information is passed to the information processing unit 115. The information processing unit 115 resolves the serial number 11 of the note and requests the note file from the central server unit 120. When this information is received by the terminal 111, the serial numbers 11 are compared and all of the alarm flags are checked. Where the note 10 meets these tests, the note approval light 111*a* is illuminated. Where a note fails one of the tests, a note alarm light 111*b* is illuminated and the system activates the video surveillance system 150 to record evidence of the person passing the note. The actual process used in this case will vary depending on the threat and safety profile of the end user.

The software in the terminal unit 111 may be embedded within a "flash memory" or a Read Only Memory (ROM) 115*b*. The software is preferably written in a 4GL language, or any high level language, and compiled prior to the burning of a ROM or placement in the "flash" memory 115*b*. This is to allow customisation of the software for each particular site. The software is used to determine the denomination of the note 10 through colour analysis and the structure of all other features/indicia scanned 11–19. Once the scan is completed, the image file is processed to retrieve the note number and a colour profile number is generated.

Figure 6:
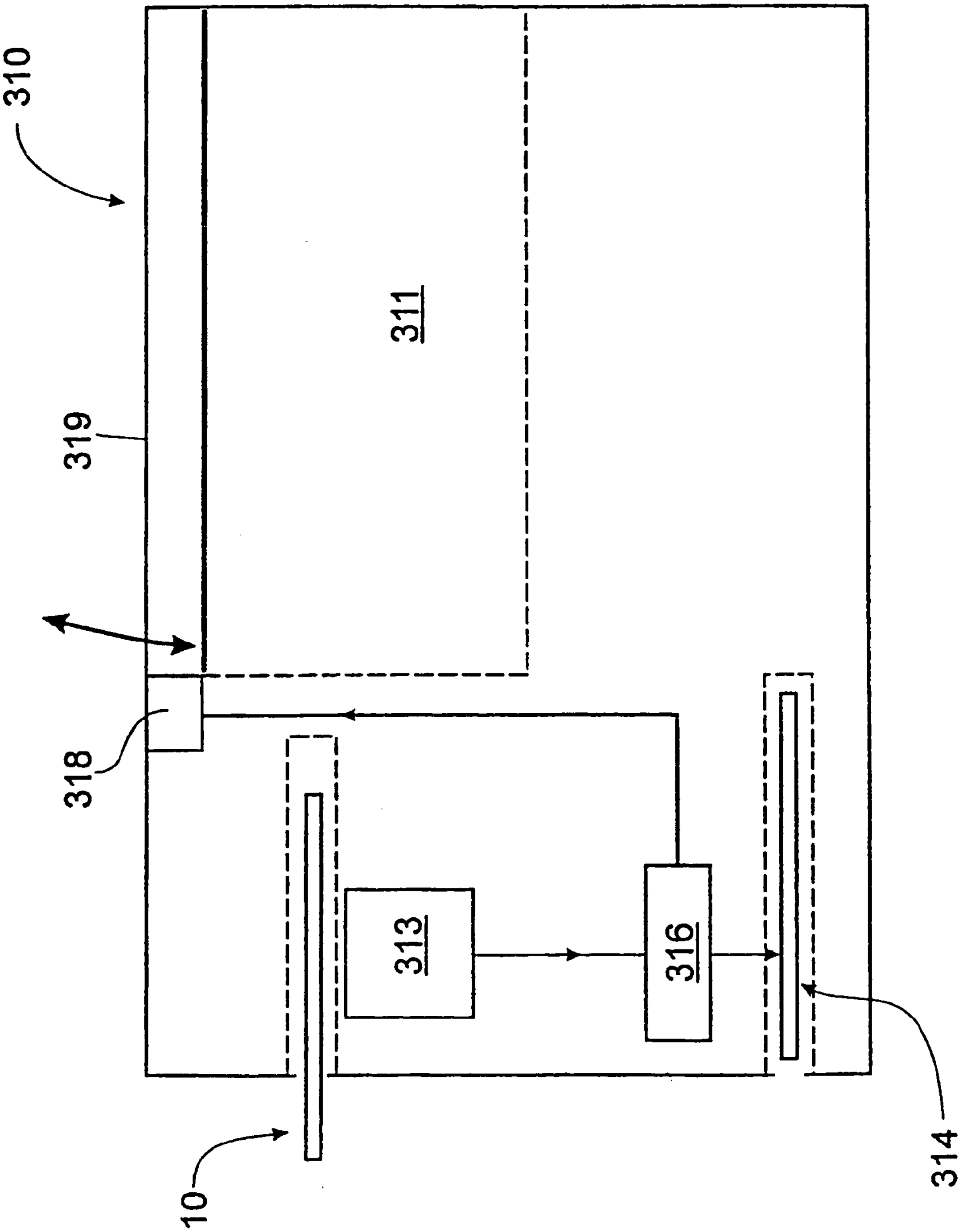
FIG. 6 is a schematic diagram of a wallet or note holder of a second embodiment.

In a second embodiment (see FIG. 6), portable wallets 310 are designed to enable the safe transit of cash or securities.

The wallet 310 has a scanning head 313 which will record the serial number data 11, via a data writer/reader 316, onto a small retrieval card 314, as the cash 10 is scanned as it enters a storage receptacle 311.

The card 314 will be required to either deposit, or retrieve, notes 10 from the wallet 310. This will enable the safe transit and storage of the wallet 310.

The note 10 can only be retrieved from the wallet 310 if the card 314 is inserted and the data writer/reader 316 instructs a lock 318 to open a door or access panel 319 to the receptacle 311.

Figure 7:
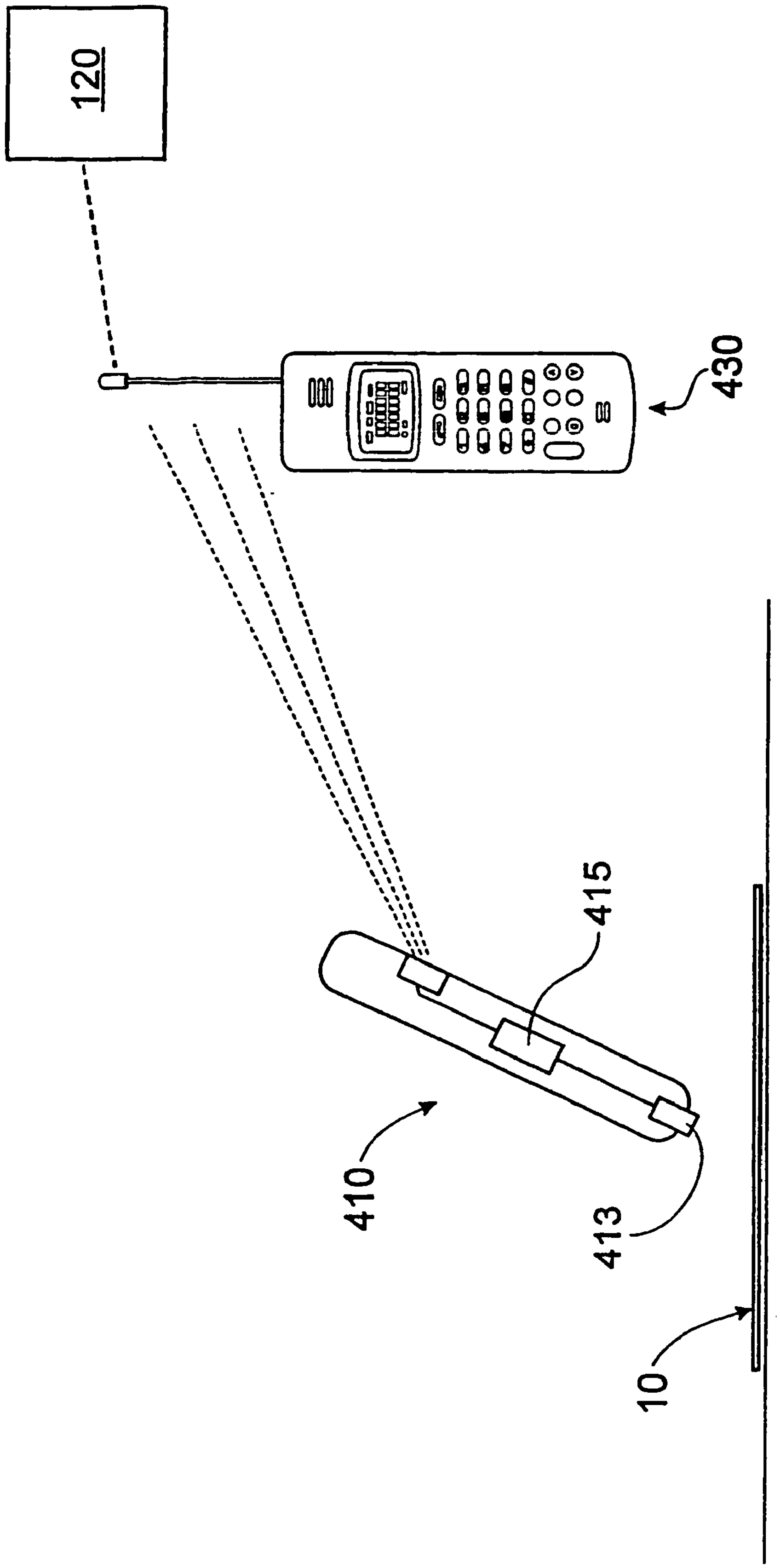
FIG. 7 is a schematic diagram of a scanning wand of a third embodiment.

In a third embodiment, a small lipstick sized, portable, rechargeable scanning wand 410 (see FIG. 7) enables designated cash notes 10 to be scanned, for instance, in the hotel room before going out shopping. The serial numbers 11 of the scanned notes 10 are scanned via a scanning head 413 and stored on a memory unit 415 stored in the wand 410. If the cash (or a wallet/purse containing the cash) is stolen, the wand has a record of the stolen note(s).

An add-on or integrated system associated with a mobile phone 430 may be used to transmit the stored serial numbers 11 to the central database computer 120 to allow the serial numbers of the notes to be notified to the authorities, eg., police. The unit can also be used to enable a cheque or cash to be cleared at a remote location s (eg., purchasing a car on the week-end with a cheque).

The operation of the database 121 will now be described.

The database 121 for currency/bank notes 10 is established as follows:

Notes 10 are scanned into the system at the Mint. The serial number 11 and any microdot (or other) security patterns 12–19 are confirmed and stored as a new masterfile and finally a master note image is recorded. From this master image, a reference colour is set and captured.

All legitimate serial numbers 11 of all notes 10 and denominations that have been issued by the Mint are on the database.

If a scanned serial number 11 does not match with a serial number 11 legitimately issued by the Mint, an alarm will be sent to the terminal unit 110 via a light or other type of silent alarm.

If a note 10 is presented to the system that creates an image file outside the tolerances of acceptability, the serial number or the masterfile will be marked and the note 10 will be withdrawn from circulation when presented at a banking interface.

The system will allow the banks to automatically separate the worn, torn damaged and incomplete notes.

It is envisaged that new types of notes will be created to incorporate new colour encryption devices, colour encrypted watermarks, and microdot 18 colour patterns through 16.7 million colours each tied to the serial number. This mark will, in turn, be able to be used to independently verify the validity of the note offline.

In line with new technologies, the clear hologram window 14 can be used to verify the unique polymer colour to add to the overall analysis of the note. This will mean that any particular note will be able to be independently verified with a number of different and independent tests.

Forging of the note 10 will require:

a) knowledge of the colour serial number link;

b) knowledge of the encrypted watermark 17;

c) the use of the correct polymer blend;

d) a valid serial number 11 from the Mint.

Cheques can have a colour dot serial number link and a link to the signature. The cheque can also, using this feature, have a unique PIN (personal identification number), which will allow the instant authorisation of the cheque.

For ultra secure company cheques, the cheques can be made up at the company and specially printed with a microdot pattern that gives an audit trail in the company to the process used to draw the cheque. This will allow cheques to be made up on demand and the machine can code all of the information into the cheque pattern prior to issue.

Another device that can be used to secure the cheque and can be used for travellers cheques is a thumbprint. This print pad can be a polymer that dries quickly when exposed to air. When the cheque is used, the top is peeled off the square and the print made. Within a very short time, the print dries and the cheque is presented. The scanner detects the image and compares it against a file entry of allowable prints.

Thumb cheques do not require a signature. It is hard to forge a fingerprint and the person who signs the cheque is secret and no name needs to be on the cheque. The cheque can be authorised upon presentation to the bank or other financial institution. Security devices can be built into the cheque and if a person is made to validate the cheque under duress, a duress fingerprint can be used. The system will be able to recognise the duress alarm and activate the security procedures.

Signatures can be unreliable, for instance, after injury or with Parkinsons Syndrome. Using the system, a validated signature file can be automatically updated. Validation can use a mixture of personal verification and advanced software tools such as fractals and chaos analysis.

Travellers cheques can have serial number and PIN identification, and can also incorporate a duress PIN feature and/or can use the polymer thumbprint devices. A PIN signature can be digitally encrypted into the travellers cheque. Stolen cheques can be easily traced and dishonoured.

The system prevents business from:

1. Theft.

All notes stored on the business premises, as scanned, will be on file. If robbed, the owner only needs to press an alarm code and the details of all of the notes on file are transmitted to the security section of the system and marked immediately as stolen. This information is then passed to all of the relevant authorities.

2. Misappropriation.

All scanned notes can be put into a database and the business owner knows with confidence the amount of cash flow through the business in relation to stock held or sold.

3. Theft/Misuse of Cheques (Personal and Travellers).

A client is requested, upon opening an account at a financial institution, to supply:

a) A PIN (personally selected);

b) Signature;

c) Finger prints—(i) designated finger for approval; and (ii) designated finger for alarm.

d) Usual identification documentation.

The PIN, signature and fingerprints are all ditigized and stored in the secure database. Whenever a cheque is presented to a terminal, the relevant sections of the captured image are analysed and compared to the master files in the relevant databases (eg., fingerprint and signature databases).

In addition, a secure PIN number may be entered into the terminal allowing instant cheque clearance, much like current plastic credit cards.

An additional feature of the EFTPOS type terminal could include a small digitizer pad for fingerprint authentication. This could either replace the current PIN number authentication or be used as an added layer of security.

Digital signature comparison to master files could be included which compares the signature on the credit card with the master file signature as well as comparison with the client created signature at the site of cash dispersal.

All inconclusive results will be referred to a central service centre for attention.

Databases (with ongoing upgrade) can store the following information:

a) valid note files—include image and serial numbers;

b) valid note serial numbers;

c) stolen/missing note registry (NB: a drug dealer who obtains his cash from various drug dealers could potentially be apprehended as he deposits the cash into his/her account, as much of the cash will probably have been stolen in armed robberies, etc.);

d) destroyed note registry;

e) damaged note registry (notes earmarked for removal and destruction);

f) fingerprint digitized image files;

g) signature digitized image files;

h) PIN number client registry.

System uses include:

a) security—all notes scanned into the system, whether in the till, a cash box, safe or wallet, etc.;

b) counterfeit detection;

c) damaged note detection;

d) identification of money laundering and other illegal currency transactions (once the system comes into general use, individual notes can be tracked).

The proposed system (in one or more embodiments) is designed to enable one or more of the following;

1. Cash, personal cheques and travellers cheques to be assessed for authenticity at the point of presentation.

2. Cash notes, serial numbers and computer image files to be stored at secure national processing laboratory in addition to a central international centre.

3. Cash serial numbers, which enter the system, are compared to master files of authentic serial numbers supplied by the national Mint.

4. Cash serial numbers, which enter the system, are compared to master files of stolen note serial numbers.

5. Cash serial numbers, which enter the system, are compared to other note serial numbers currently stored within the system to see if any duplications are present.

6. Recording and deleting of note serial numbers as they enter and leave the till at the end user interface. This allows a is digital record of cash transactions going through the till, in addition to recording the serial numbers of notes held within the till should a thief occur.

7. Colour and image analysis of presented tender, identifying damaged notes which are then recorded centrally and digitally tagged to allow their removal from circulation at an appropriate location.

8. Appropriate law enforcement agencies to be notified of any stolen or forged notes presented to the system or any notes stolen from the system.

9. Integration of the system into secure tills, secure cash transportation boxes and safes.

10. Remote cash authentication using either a conventional mobile phone with a specifically designed clip-on scanner, or an integrated mobile phone with built-in scanner. Customers can dial into the national centre, enter a PIN number and then scan the notes at the point of sale.

11. Option of small, lipstick sized optical scanner, which can be manually rolled over the serial number on a cash note. This serial number is compared to stored numbers within the ROM within the device. The device is battery powered and the ROM is upgradeable.

12. The tracking of individual notes as they move is throughout the market (once the system has been fully implemented within a nation).

13. Integrated internationally operation centre will notify other national centres and law enforcement agencies (eg., FBI) of stolen or forged foreign currency and notes.

14. Personal and travellers cheques can be cleared by using a personal PIN number as well as a signature upon presentation to the system.

15. Personal cheques presented to the system can be electronically checked against account balances (in a similar fashion to plastic cash cards).

16. Clients' signatures and/or finger prints can be scanned into the system when an account is opened at a financial institution. This master signature file can then be compared against signatures and/or finger print admitted to the system at a later date upon cheque presentation (the fingerprints can be read in "real time" for the cashing of cheques/access to secure areas).

17. Special cheques to be manufactured, which allow a finger print to be placed on the cheque in place of or in addition to a signature. A region of the cheque can have a peel of polymer cover which reveals a polymer pad which enables a fingerprint to be made. The polymer pad solidifies a few seconds after the peel off cover has been removed. Customers can designate the finger they wish to use and can include an alarm finger. Fingerprints allow a degree of anonymity and allow disabled people (eg., Parkinsonism, etc.) to avoid the signature process.

18. Photocopiers where "secure" documents having identifying features/indicia can only be copied by authorised persons.

19. Photographs/video images can be stored and compared for recognition purposes.

20. All the data can be stored in a central "data vault", where third parties are billed each time they access the data to check the authentication/recognition of a document, etc.

It will be readily apparent to the skilled addressee that the range of potential applications is limitless.

Various changes and modifications may be made to the embodiments described and illustrated without departing from the present invention.

What is claimed is:

1. Apparatus for document inventory including:

means for scanning each document to obtain (a) identifying information and (b) changeable information on one or more pre-existing features and/or indicia for each document as each document enters a receptacle for documents;

means for storing of the identifying information of each document in a memory connected to the receptacle;

means for comparing the scanned changeable information with a master file in the memory and for updating the master file to record changes in the scanned changeable features and/or indicia of the document;

means for scanning an exiting document as the exiting document exits the receptacle to obtain the same identifying information of the exiting document as obtained during entry into the receptacle; and means for deleting the identifying information of the exiting document from the memory such that the memory only has identifying information for documents presently in the receptacle.

2. Apparatus as claimed in claim 1 wherein:

the documents are bank notes, and the serial numbers thereof are scanned by the means for scanning to enable a digital record of cash transactions to be made and to record the serial numbers of bank notes held in the receptacle should theft occur.

3. Apparatus as claimed in claim 1 wherein:

the memory includes a card means operable to receive the information and a card reader associated with the receptacle, the document only being releasable from the receptacle when the card means is placed in, or read by, the card reader.

4. Apparatus according to claim 3 wherein:

the means for scanning the document is a scanning head operable to scan the document for one or more pre-existing identifying features and/or indicia; and the memory includes a data writer operable to record the data onto the card means.

5. Apparatus as claimed in claim 1 wherein:

the receptacle is one of a cash drawer, cash register, money drop box, cash box, or wallet.

6. Apparatus according to claim 1 wherein:

the memory is an information processing unit connectable to a computer.

7. Apparatus as claimed in claim 1 and further including:

a releasing means which allows release of the exiting document from the receptacle after deleting of the identifying information from the memory.

8. A method of document inventory including the steps of:

scanning each document to obtain (a) identifying information and (b) changeable information for one or more pre-existing features and/or indicia of each document as each document enters a receptacle for documents;

storing of the identifying information of each document in a memory connected to the receptacle;

comparing the scanned changeable information with a master file in the memory and updating the master file to record changes in the scanned changeable features and/or indicia of the document;

scanning an exiting document as the exiting document exits the receptacle to obtain the same identifying information of the exiting document as obtained during entry into the receptacle; and deleting the identifying information of the exiting document from the memory such that the memory only has identifying information for documents in the receptacle.

9. A method as claimed in claim 8, further including the step of;

releasing the exiting document from the receptacle after deleting of the identifying information from the memory.

* * * * *